INDEX MECHANISM

Filed March 14, 1961 2 Sheets-Sheet 1

Inventors:
Norman D. Cappelle
John J. Kornacker and John Y. Ma
By Robert L. Kahn Atty.

July 9, 1963 N. D. CAPPELLE ET AL 3,096,665

INDEX MECHANISM

Filed March 14, 1961 2 Sheets-Sheet 2

Inventors:
Norman D. Cappelle
John J. Kornacker
John Y. Ma
By Robert L. Kahn Atty.

3,096,665

INDEX MECHANISM

Norman D. Cappelle, Park Ridge, John J. Kornacker, Niles, and John Y. Ma, Maywood, Ill., assignors to Oak Manufacturing Co., Crystal Lake, Ill., a corporation of Delaware Filed Mar. 14, 1961, Ser. No. 95,731
12 Claims. (Cl. 74—527)

This invention relates to an index mechanism and more particularly to one having substantially no rotary play or backlash at any index position.

Index mechanisms are widely used and are embodied in a variety of forms. The index mechanism with which this invention is concerned is a simple, economical device requiring little accuracy in its make-up. Such a device may be used with tuners for communication equipment, as for example, television receivers, F.M. radio receivers, oscillators for various kinds of equipment and may be used any place where quick and accurate indexing with no rotary play is essential or desirable.

The invention generally contemplates a spring biased index means in combination with special means for journalling the shaft to be indexed. Variations in the construction of the parts may be made to take account of such design objectives as torque for turning the shaft and accuracy of index action.

The spring biased index means comprises a spring biased finger or ball cooperating with a generally rigid index plate. The index means and shaft journal are provided with oppositely directed V notches. The reaction of the index means to the spring forces created by indexing results in the shaft and finger or ball being pressed into the V's.

Referring to the drawings, FIGURE 1 is a perspective view with certain parts broken away and showing a TV tuner housing having a shaft provided with the new index means and shaft support.

Figures 1, 5, 6, 7, 8, 9, 10:
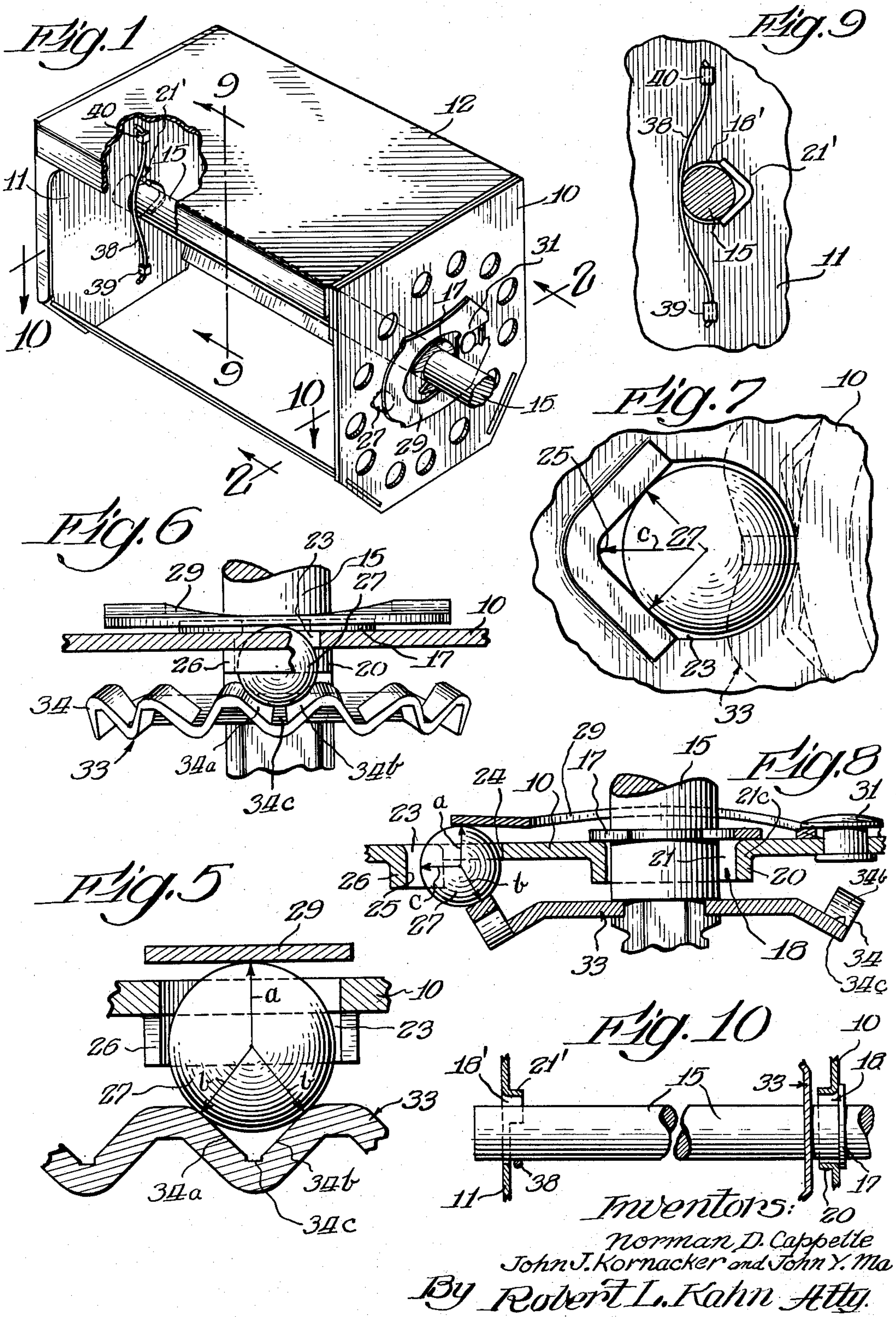
FIGURE 5 is a sectional detail on line 5—5 of FIGURE 3.
FIGURE 6 is a detail on line 6—6 of FIGURE 2.
FIGURE 7 is an enlarged detail on line 7—7 of FIGURE 3.
FIGURE 8 is a view similar to FIGURE 3 but showing the parts of the index means in an unstable position between index positions.
FIGURE 9 is a detail on line 9—9 of FIGURE 1.
FIGURE 10 is a detail on line 10—10 of FIGURE 1.

The improved index means and shaft suspension is generally useful in devices where low manufacturing cast requirements make a high degree of mechanical accuracy impossible to attain. However, in such devices as previously enumerated, a high degree of index action is frequently required wtihout a corresponding mechanical accuracy in the device as a whole. A tuner housing illustrated in FIGURE 1 comprises front plate 10 and back plate 11 with suitable side walls 12. Journaled within the end plates 10 and 11 is shaft 15 which may operate suitable means for providing a tuning action in a TV receiver as one concrete example. Inasmuch as the details of construction of the tuner have no pertinence to the present invention, no detailed description need be given.

An index mechanism associated with shaft 15 is provided to define certain rotary positions of the shaft. As is well known, only one index mechanism is required for a shaft and in this particular instance, such an index mechanism may be disposed to operate in conjunction with front plate 10. A special shaft suspension to be fully described is provided at the plate where the index means is provided. The free end of the shaft which in the present instance is journaled in rear plate 11 may also be provided with the special suspension although it is to be understood that this is a refinement which is not essential.

It is important that shaft 15 to be indexed must be restrained from longitudinal movement. Accordingly, shaft 15 is slotted and is provided with a C washer 17 in said slot at a position so that C washer 17 can bear against one face, such as the outer face of front plate 10. Shaft 15 is journaled in front plate 10, this journal consisting of punched out or stamped out region 18 through which shaft 15 can pass.

Figure 2:
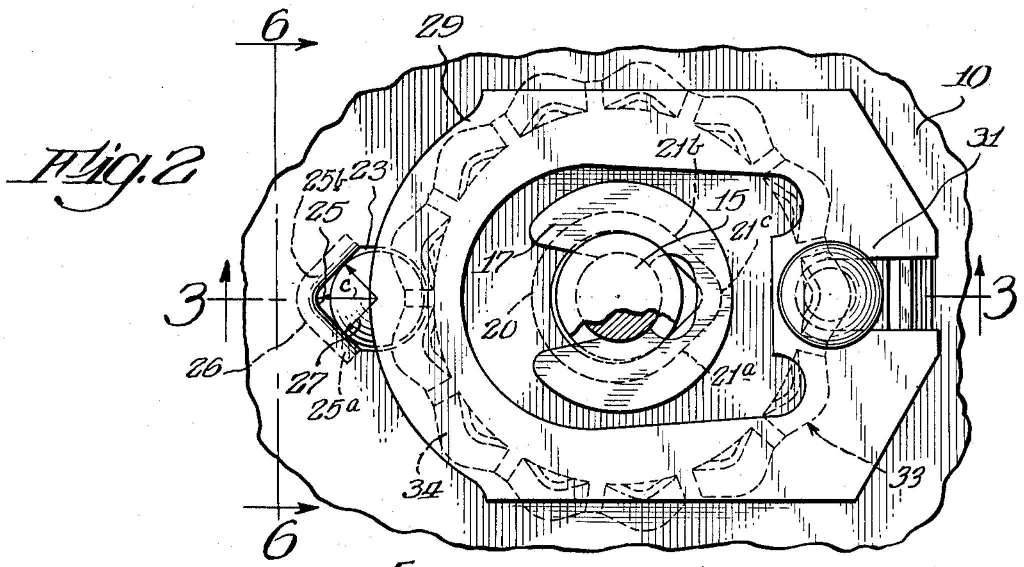
FIGURE 2 is an enlarged detail on line 2—2 of FIGURE 1.
Figure 4:
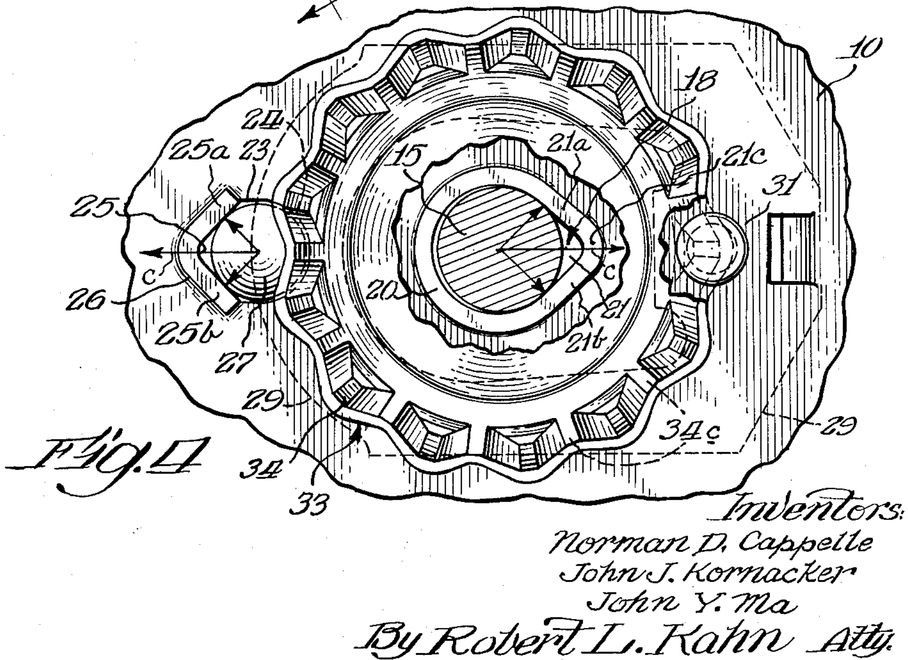
FIGURE 4 is a section on line 4—4 of FIGURE 3.

Journal 18 may be provided with flange portion 20 which, in this instance, extends rearwardly of plate 10, this being toward rear plate 11. However, the direction of flange 20 is not important. Journal 18 is conventional in shape except that one side portion of the journal is notched or deformed, as at 21, from the normal circular outline of a conventional journal as seen transversely of the shaft. As seen in that manner, notched portion 21 of the journal has two generally straight portions 21*a* and 21*b* which may generally be tangent to the shaft and meet at notch journal portion 21*c*. The meeting point of the two straight portions need not be sharp and as indicated in FIGURES 2 and 4, for example, the two straight portions meet and form a curved portion. Portions 21*a* and 21*b* as viewed transversely of the shaft may conveniently be straight at about 90° to each other. This however, is not essential and the angle subtended between the points of tangency can depart from 90°. The notched portion has such a shape and dimension that shaft 15 can be laterally moved in the journal toward the notched portion to provide a two point bearing support . The shape of the notched portion beyond the two point support is not important.

The orientation of the notch is not important in itself, but only in relation to the orientation of an additional notch, to be described later. Front plate 10 is provided with aperture 23 laterally offset from journal 18. Aperture 23 is generally similar to journal 18, insofar as shape is concerned, although the physical dimensions may be entirely different. Thus aperture 23 has generally circular portion 24 and notched V portion 25. V portion 25 is similar to notched portion 21 of the shaft journal insofar as having two straight portions 25*a* and 25*b* meeting to form a V. V portion 25 has the metal bent to form flange 26.

The notched portions 21 and 25 are symmetrically disposed with regard to a straight line extending between the center of the journal and the center of apertured portion 23. The centers may be the points of intersection of lines drawn perpendicular to the tangents and intersecting within the respective regions. These are indicated by arrows in FIGURE 4 and these centers may be close to if not coincident with the actual centers of the generally circular regions of the stamped out portions of the front plate. The tips of the notches extend away from each other from the far sides of the journal and aperture.

Operating in aperture 23 is a spring biased index member, such as for example, steel ball 27. There is no need for any high degree of accuracy in forming apertured portion 23. So long as ball 27 can move freely in desired directions, that will be sufficient.

Ball 27 is spring biased by leaf spring 29 disposed on the front side of plate 10. Leaf spring 29 as illustrated here is cut out to straddle shaft 15 and is anchored to the front plate at region 31 by suitable mean such as a rivet.

The center of anchorage for spring 29 is in the center line passing through the notches previously described. The shaft journal is disposed between anchor region 31 of the spring and ball recess 23 of the front plate. Leaf spring 29 urges ball 27 through recess 23. Ball 27 may be integral with spring 29.

Figure 3:
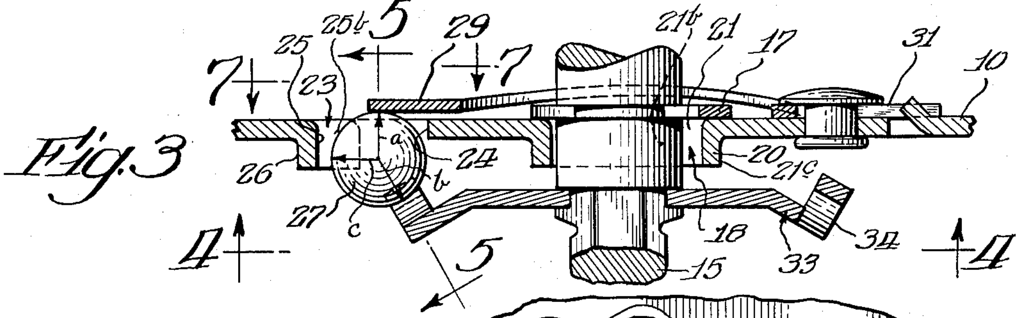
FIGURE 3 is a section on line 3—3 of FIGURE 2.

Cooperating with ball 27 is index plate 33 rigidly secured to shaft 15 to rotate therewith. Leaf spring 29 and index plate 33 are on opposite sides of front plate 10 and have ball 27 between them. Index plate 33 has an active wavy index portion 34 which is tilted out of the plane of plate 33, as illustrated in FIGURE 3. The effective radius of the active index portion is less than the radial distance from the center of the shaft to the center of ball 27 so that the tilt of active index portion 34 is away from the front plate. By having the V notches disposed so that they extend toward each other from the near sides of the journal and aperture it would be possible to tilt active index portion 34 toward the front plate rather than away from the front plate. In such case the effective radius of the index plate would have to be greater than the distance between the center of the ball and the center of the shaft.

Active index portion 34 is a generally conventional wavy portion to provide hills and valleys. The active index portion is more clearly shown in FIGURES 5 and 6. The actual shape of the active index portion may vary within limits and is here shown consisting of slope portions **34*a* and 34*b* meeting at valley 34*c*. As seen in FIGURES 5 and 6, the angle between the sides of the index valley is substantially 90°. This angle is not critical. In general, the details of the angle of the active index portion of the index plate will follow conventional practice. It is understood that index plate 33** is strong enough so that it will not be deformed appreciably during normal operation of the index means.

Leaf spring 29 is on the same side of front plate 10 as C washer 17. Thus the spring force providing the detent action also maintains shaft 15 against longitudinal movement.

Rear plate 11 may be provided with journal 18′ generally similar to journal 18 of the front plate. Rear journal 18′ is provided with notched portion 21′ and it is desirable to have the notches in the two journals in alignment. Shaft 15 is biased laterally into notched portion 21′ at rear plate 11 by any suitable means. A simple bias means consists of spring 38 having its ends anchored in ears 39 and 40 punched out of back plate 11. As shown in FIGURE 9, spring 38 laterally biases shaft 15 to engage the notched portion of the journal.

The bias action of the index means at the front and the spring at the rear of the housing tends to urge the shaft to a position where it has support at a few spaced points. Thus the shaft at the front journal will be biased at all times by the index mechanism so that the shaft itself engages the journal at two points as seen transversely of the shaft, these points being at the notched region. The third point of support for the shaft is derived from the pressure of rounded part 27 bearing against the wavy index portion of the index plate. This is true even though the shaft is at rest in an indexed position.

With respect to the rear journal, spring 38 will engage the shaft at one or more points but the resultant of this force created by spring 38 will be the same as a force at one point of the shaft.

The arrows shown in FIGURES 3, 4, 5 and 8 show the directions of various forces acting within the mechanism. Thus in FIGURE 3, the three arrows within ball 27 show the general directions of certain forces. When leaf spring 29 bears down upon ball 27 and the ball rests, this force generally is in the direction indicated by arrow *a*. The exact direction of arrow *a* may depart somewhat from that shown due to a component of force of spring 29 parallel to front plate 10.

Arrow *b* shows the reactive component of force within the ball resulting from the engagement of the ball and the valley of the index plate. Arrow *b* is tilted from *a* so that component *c* is a force which tends to push ball 27 toward notched portion 25. The exact direction of these arrows may vary somewhat depending upon the precise angles and dimensions making up the entire mechanism. However, the objective is to have ball 27 pressed down against the active index portion in such a manner that forces perpendicular to the axis of shaft 15 are created.

It is clear that in the diagram illustrated in FIGURE 3, there will be a force at the index plate which will tend to move shaft 15 toward notched portion 21. Thus the forces created by the index means are directed in such a way as to move the shaft and index ball in opposite directions and result in these two parts being supported at relatively few points. In the example illustrated in the drawing, the notched portions are pointed away from each other from the remote sides of their respective regions. However, it is clear that the two notched portions can be reversed so that they point toward each other from adjacent sides of the regions containing the notches. In such case, the tilt of active index portion 34 will have to be toward front plate 10 rather than away from it as illustrated in FIGURE 3. Furthermore, active index portion 34 will have to extend further from shaft 15 so that arrow *b* will slope to the left rather than to the right of arrow *a*, as illustrated in FIGURE 3.

It will be evident that the journals for shaft 15 should have some clearance for the shaft to permit lateral movement of the shaft. In addition, the dimensions of apertured portion 23 for accommodating ball 27 should be generous enough to permit some lateral movement of ball 27. As is true in such index devices as illustrated here, ball 27 must be large enough so that one part is accessible to leaf spring 29 while the other part can engage index portion 34.

Leaf spring 29 may be replaced by any suitable spring means exerting a force downwardly upon ball 27 as seen in FIGURE 3. It is also possible to replace ball 27 by a finger integral with spring 29, such finger having an embossing to provide a ball shaped part. The arrangement illustrated, however, is simple and provides a self-contained index structure which maintains the shaft in correct longitudinal position.

What is claimed is:

1. An index means for a shaft, comprising at least one support plate, a shaft having a round portion for support in a journal, said plate having a journal portion through which said round shaft portion passes, said journal portion having a generally notched portion so dimensioned and shaped that said shaft portion has some lateral play and when moved toward said notched portion said shaft is supported thereby, an index plate movable with said shaft adjacent said support plate, said index plate having a wavy index portion inclined out of a plane normal to the shaft, said support plate having an aperture generally registering with said wavy index portion, said aperture having a notched portion generally similar to the journal notched portion, each notched portion being generally symmetrical about a straight line between the centers of said journal region and aperture region, spring means including a ball shaped portion for cooperating with said wavy index portion, said ball shaped portion operating in said plate aperture, said spring means providing a force urging said ball shaped portion through the aperture and toward said wavy index portion, said two notched portions being so directed and the inclination of said index portion being such that the force of said spring bias on said ball shaped portion creates force components tending to urge said ball shaped portion and journaled shaft portion into their respective notched portions.

2. The structure according to claim 1 wherein said spring means includes a leaf spring anchored to the support plate.

3. The structure according to claim 2 wherein said notched portions provide bearing regions along spaced apart lines parallel to the shaft axis.

4. An index means for a shaft, comprising at least one support plate, a shaft having a round portion for support in a journal, said plate having a journal portion through which said round shaft portion passes, said journal portion having a generally notched portion so dimensioned and shaped that said shaft portion has some lateral play and when moved toward said notched portion said shaft is supported thereby, an index plate movable with said shaft adjacent said support plate, said index plate having a wavy index portion inclined away from the support plate out of a plane normal to the shaft, said support plate having an aperture generally registering with said wavy index portion, said aperture having a notched portion generally similar to the journal notched portion, each notched portion being generally symmetrical about a straight line between the centers of said journal region and aperture region and extending away from the other from the remote sides of said regions, spring means including a ball shaped portion for cooperating with said wavy index portion, said ball shaped portion operating in said plate aperture, said spring means creating a force urging said ball shaped portion through the aperture and toward said wavy index portion, the force from said spring on said ball shaped portion creating force components urging said ball shaped portion and journaled shaft portion into their respective notched-portions.

5. The structure according to claim 4 wherein said spring means includes a leaf spring having one end anchored to the support plate on said center line at a region such that the journal is between the aperture and anchor region, said spring having its other end at the aperture, said shaft having a washer disposed in a slot in said shaft for preventing longitudinal shaft movement, said washer bearing against the front plate and being on the same side of the front plate as said leaf spring whereby said index and shaft are maintained in assembled relation.

6. The structure according to claim 5 wherein said notched portions include flange wall portions to provide bearing regions along lines parallel to the shaft axis.

7. The structure according to claim 6 wherein said ball shaped portion comprises a metal ball.

8. The structure according to claim 7 wherein said notched portions include substantially straight portions at about 90° to each other.

9. In a rotary shaft mounting and indexing assembly: a body member having a shaft journal and an aperture each defined in part by a notch, the notches being oriented in opposite directions along a line extending generally through centers of said journal and aperture; a rotary shaft having a longitudinal axis and received in said journal for rotation about said axis; an indexing member rigidly mounted on said shaft for rotation therewith; means providing rotary indexing of said shaft and urging said shaft in a direction transversely of its axis for operatively seating said shaft in the journal notch, said means comprising an indexing portion of said indexing member inclined with respect to the shaft axis and generally aligned with said aperture; a ball seated in said aperture and against said indexing portion; and means comprising a spring mounted on said body member and engaging said ball, resiliently urging said ball into said aperture notch and against said indexing portion.

10. In a rotary shaft mounting and indexing assembly; a body member having a shaft journal defined in part by an outwardly extending notch; a rotary shaft received in said journal for rotation about said axis; an indexing member rigidly mounted on said shaft and having an indexing portion inclined with respect to the shaft axis; a detent seated against said indexing portion; and a spring mounted on said body member and seated against said detent and resiliently urging said detent against said indexing portion in a direction urging said shaft into said notch.

11. In a rotary shaft mounting and indexing assembly; a body member having opposite sides and a shaft journal and an aperture; a rotary shaft having a longitudinal axis and received in said journal for rotation about said axis; an indexing member mounted on said shaft for rotation therewith; means providing rotary indexing of said shaft and urging said shaft in a direction transverse to its axis for operatively seating said shaft against a limited portion of said journal, said means comprising an indexing portion of said indexing member inclined with respect to the shaft axis on one side of said body member and generally aligned with said aperture; a ball detent seated in said aperture and against said indexing portion; and means comprising a leaf spring mounted on said body member and engaging said detent on a side of said body member opposite said indexing portion and resiliently urging said detent against said indexing portion.

12. In a rotary shaft mounting and indexing assembly: a body member having a journal; a shaft rotatably mounted in said journal; means providing rotary indexing of said shaft and urging said shaft laterally against a limited portion of said journal, said means comprising shaft indexing means including an indexing member mounted on said shaft for rotation therewith and a detent seated against said indexing member, and means urging said detent against said indexing member in a direction generally axial of said shaft.

References Cited in the file of this patent

UNITED STATES PATENTS

| | | |
|---|---|---|
| 1,019,105 | Waters | Mar. 5, 1912 |
| 2,558,502 | Williams | June 26, 1951 |
| 2,927,168 | Brown | Mar. 1, 1960 |
| 2,938,392 | Lyman | May 31, 1960 |
| 2,996,971 | Goettl | Aug. 22, 1961 |

FOREIGN PATENTS

| | | |
|---|---|---|
| 721,657 | Germany | June 12, 1942 |
| 1,123,363 | France | June 11, 1956 |